(12) United States Patent
Chen

(10) Patent No.: US 8,070,174 B2
(45) Date of Patent: Dec. 6, 2011

(54) MULTI-MODE TANDEM BICYCLE

(75) Inventor: Yu-Gang Chen, Yongkang (TW)

(73) Assignee: Far East University, Tainan County (TW)

( * ) Notice: Subject to any disclaimer, the term of this patent is extended or adjusted under 35 U.S.C. 154(b) by 1217 days.

(21) Appl. No.: 11/806,687

(22) Filed: Jun. 4, 2007

(65) Prior Publication Data

US 2008/0296862 A1 Dec. 4, 2008

(51) Int. Cl.
*B62M 1/20* (2006.01)
(52) U.S. Cl. ............ 280/231; 280/226.1; 280/241
(58) Field of Classification Search ......... 280/226.1, 280/231, 241, 262
See application file for complete search history.

(56) References Cited

U.S. PATENT DOCUMENTS

| | | | | |
|---|---|---|---|---|
| 316,649 A * | 4/1885 | Pausey | ............ | 280/231 |
| 391,895 A * | 10/1888 | Hall | ............ | 280/231 |
| 391,947 A * | 10/1888 | Copeland | ............ | 280/231 |
| 415,072 A * | 11/1889 | Starley | ............ | 280/231 |
| 416,493 A * | 12/1889 | Phillips | ............ | 280/231 |
| 434,615 A * | 8/1890 | Warwick | ............ | 280/231 |
| 442,174 A * | 12/1890 | Elliott | ............ | 280/231 |
| 448,358 A * | 3/1891 | Moore | ............ | 280/231 |
| 548,187 A * | 10/1895 | Fortney | ............ | 280/231 |
| 568,862 A * | 10/1896 | Miehle | ............ | 280/231 |
| 605,933 A * | 6/1898 | Sunderland | ............ | 475/349 |
| 616,262 A * | 12/1898 | Schaum | ............ | 280/231 |
| 616,481 A * | 12/1898 | Miehle | ............ | 280/231 |
| 642,560 A * | 1/1900 | Payne | ............ | 280/274 |
| 647,786 A * | 4/1900 | Anderson | ............ | 280/231 |
| 679,283 A * | 7/1901 | Nichols | ............ | 280/231 |
| 3,075,788 A * | 1/1963 | Silbereis | ............ | 280/281.1 |
| 4,070,032 A * | 1/1978 | Cunningham | ............ | 280/231 |
| 4,600,206 A * | 7/1986 | Di Paolo | ............ | 280/231 |
| 5,215,322 A * | 6/1993 | Enders | ............ | 280/231 |
| 5,964,472 A * | 10/1999 | Smith et al. | ............ | 280/231 |
| 6,095,539 A * | 8/2000 | Graham | ............ | 280/231 |
| 2003/0057672 A1* | 3/2003 | Baker et al. | ............ | 280/231 |

* cited by examiner

*Primary Examiner* — Joanne Silbermann
*Assistant Examiner* — Maurice Williams
(74) *Attorney, Agent, or Firm* — Muncy, Geissler, Olds & Lowe, PLLC

(57) ABSTRACT

A multi-mode tandem bicycle includes a frame, a steering wheel, a directional wheel, a first pedaling member, a second pedaling member, a first seat, a second seat, a first transmission unit, and a second transmission unit. By pivoting at least one of the first seat and the second seat on the frame, direction of the first seat or the second seat can be changed and fixed on the aforementioned frame, and at least one of the first seat and the second seat is pointed toward and connected with the steering wheel, thereby resulting in a variety of riding modes.

2 Claims, 6 Drawing Sheets

MULTI-MODE TANDEM BICYCLE

BACKGROUND OF THE INVENTION a) Field of the Invention

The present invention relates to a multi-mode tandem bicycle, and more particularly to a multi-mode tandem bicycle wherein direction of a first seat and direction of a second seat can be changed on a frame, and at least one of the first seat and the second seat is pointed toward and connected with a steering wheel, so as to provide a variety of riding modes.

b) Description of the Prior Art

The U.S. Pat. No. 5,282,639, "Folding Tandem Bicycle" discloses primarily a folding tandem bicycle which includes a front body part, a rear body part, an intermediate body part connected between the front body part and the rear body part by parallel pairs of upright tubes and pairs of connecting devices, a front transmission mechanism driven by a set of pedals through a front sprocket to rotate a front flywheel and a front wheel through a cable, and a rear transmission mechanism driven by a set of pedals through a rear sprocket to rotate a rear flywheel and a rear wheel through a chain. By disconnecting either one of each pair of connecting devices, the front body part, the intermediate body part and the rear body part are allowed to be folded up and attached with one another side by side. On the other hand, by disconnecting the intermediate body part from the front and rear body parts, the front and rear body parts are connected into a single-seat bicycle for one rider.

SUMMARY OF THE INVENTION

Accordingly, the conventional tandem bicycle is in lack of variation on riding modes, and is in short of interest. Therefore, the present invention is to provide a multi-mode tandem bicycle which includes a frame having a first part and a second part that are connected with each other; a steering wheel which is located at the first part of the frame; a directional wheel which is located at the second part of the frame; a first pedaling member which is pivotally located at the first part of the frame; a second pedaling member which is pivotally located at the second part of the frame; a first seat, which is located at the first part of the frame, and includes a first saddle and a first handle; a second seat, which is located at the second part of the frame, and includes a second saddle and a second handle; a first transmission unit which connects the first pedaling member and the directional wheel; and a second transmission unit which connects the second pedaling member and the directional wheel. Direction of at least one of the aforementioned first seat and the second seat can be changed and fixed on the aforementioned frame, and at least one of the first seat and the second seat is pointed toward and connected with the steering wheel.

The aforementioned first part is provided with a first fixed end and a first assembly end, wherein the first assembly end links with the steering wheel; and a first connection part is located at a bottom part of the first handle, allowing the first handle to be loosely connected to the first fixed end or the first assembly end.

The aforementioned second part is provided with a second fixed end and a second assembly end, and a second connection part is located at a bottom part of the second handle, allowing the second handle to be loosely connected to the second fixed end or the second assembly end.

The aforementioned second assembly end is provided with a connecting rod, and the first part is provided respectively with a control end and an engaging end to be loosely and selectively connected with the connecting rod, whereas the steering wheel is linked by the control end.

The aforementioned directional wheel is provided with a first gear, and the first transmission unit is provided with a movable first driving gear and a first idler to be selectively gnawed with a first driven gear, wherein the first transmission unit is provided with the first driving gear for connecting to the first pedaling member, and a first chain is wound on the first driven gear for connecting to the first gear of the directional wheel.

The aforementioned directional wheel is provided with a second gear, and the second transmission unit is provided with a movable second driving gear and a second idler to be selectively gnawed with a second driven gear, wherein the second transmission unit is provided with the second driving gear for connecting to the second pedaling member, and a second chain is wound on the second driven gear for connecting to the second gear of the directional wheel.

The present invention is provided with the following effects:

1. The present invention allows riders to choose to ride on in same direction (forward), in opposite direction, or by facing toward each other, thereby increasing variability and interest.
2. In association with different riding direction and pedaling direction of the riders, different gnawing methods can be selected for the first transmission unit and the second transmission unit of the present invention, thereby facilitating the riders to choose according to their needs.
3. According to different riding modes of two riders, a first rider or a second rider can choose by himself or herself to control the steering wheel for changing direction.

To enable a further understanding of the said objectives and the technological methods of the invention herein, the brief description of the drawings below is followed by the detailed description of the preferred embodiment.

DETAILED DESCRIPTION OF THE PREFERRED EMBODIMENTS

Figure 1:
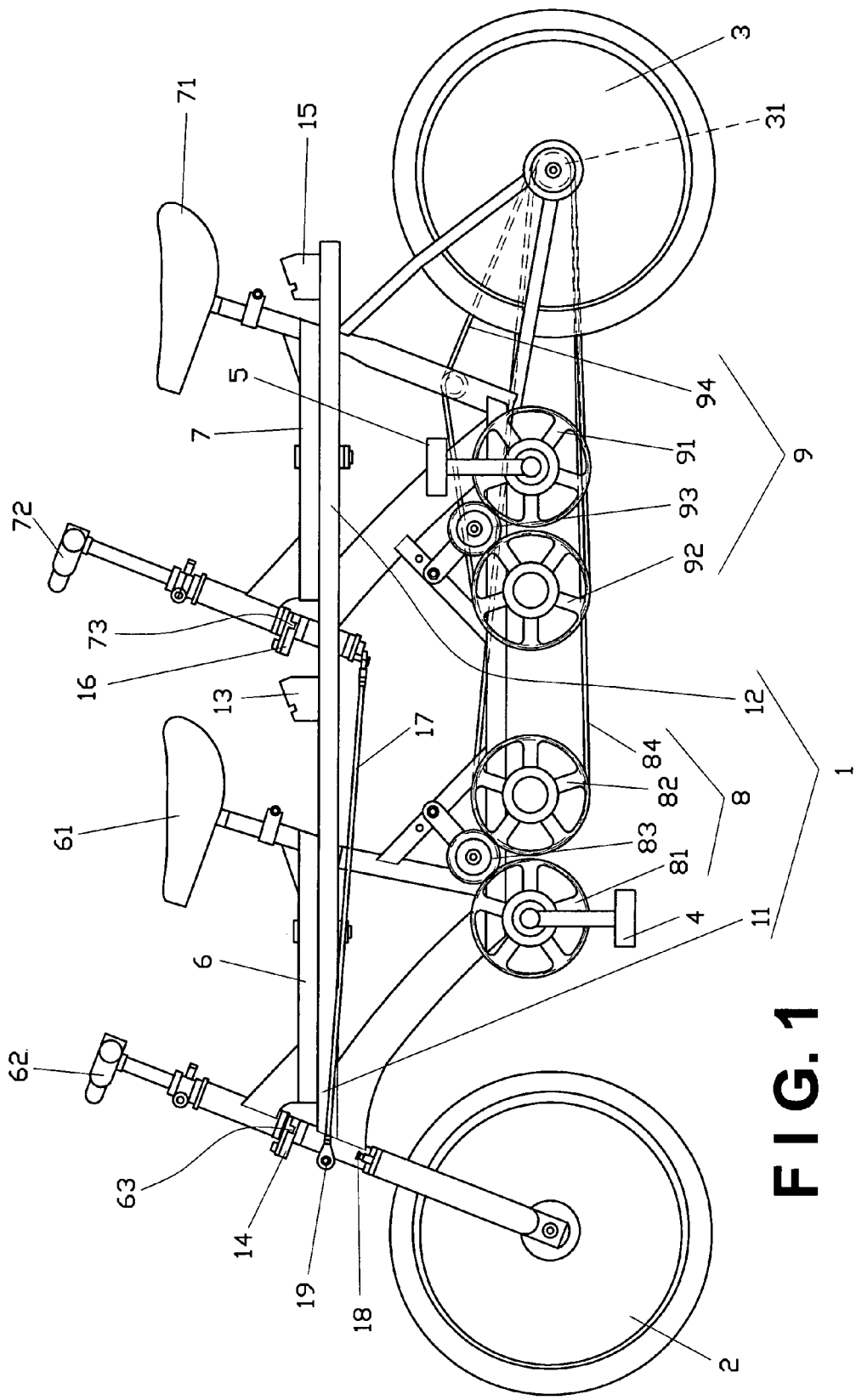
FIG. 1 shows a schematic view of a mode that a first seat and a second seat are facing toward same direction (forward), according to the present invention.

Referring to FIG. 1, the present invention includes primarily a frame 1, a steering wheel 2, a directional wheel 3, a first pedaling member 4, a second pedaling member 5, a first seat 6, a second seat 7, a first transmission unit 8, and a second transmission unit 9.

Figure 4:
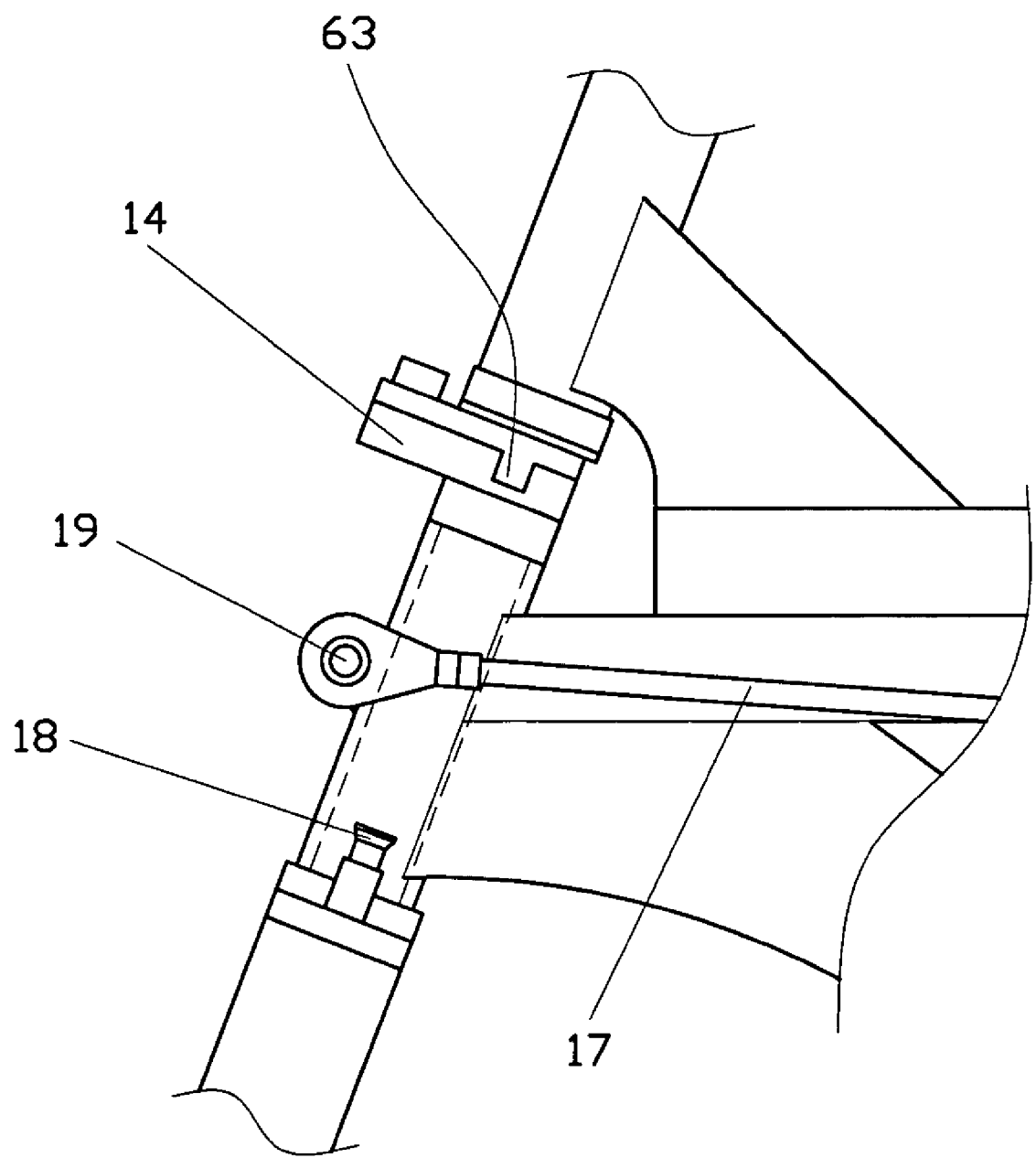
FIG. 4 shows a schematic view of a connecting rod being connected to an engaging end, according to the present invention.

The frame 1 is provided with a first part 11 and a second part 12 that are connected at their front and rear ends, the first part 11 is disposed with a first fixed end 13 and a first assembly end 14, the second part 12 is disposed with a second fixed end 15 and a second assembly end 16, a top part of the second assembly end 16 is connected with a connecting rod 17 (as shown in FIG. 4), and in front of the first part 11 are disposed respectively with a control end 18 and an engaging end 19 which are loosely and selectively connected with the connecting rod 17, respectively.

The steering wheel 2 is located at the first part 11 of the frame 1, and is connected with and linked by the first assembly end 14. The steering wheel 2 is also linked by the control end 18.

Figure 6:
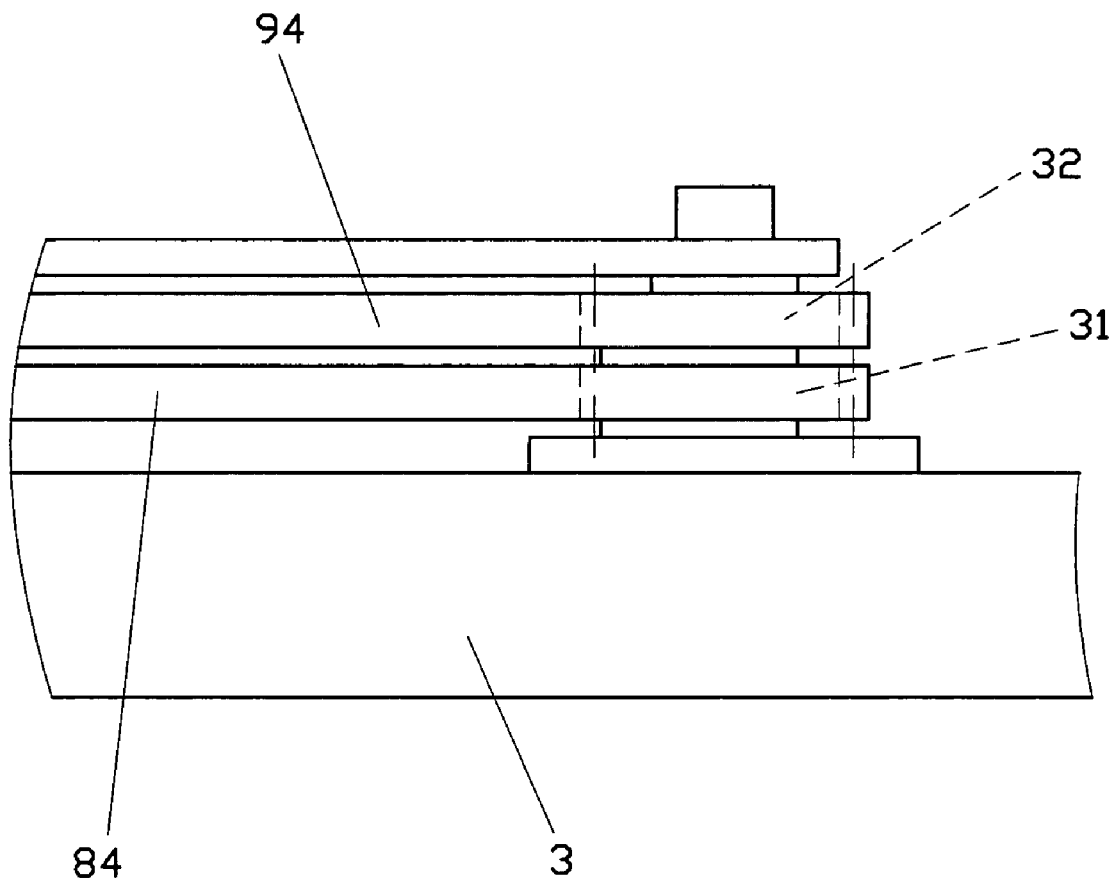
FIG. 6 shows a schematic view of a directional wheel which is coaxially provided with a first gear and a second gear, according to the present invention.

The directional wheel 3 is located at the second part 12 of the frame 1, and is coaxially disposed with a first gear 31 and a second gear 32 (as shown in FIG. 6).

The first pedaling member 4 is pivotally located at the first part 11 of the frame 1, and the second pedaling member 5 is pivotally located at the second part 12 of the frame 1.

The first seat 6 is located at the first part 11 of the frame 1 (in this embodiment, a pivoting method is used), and is pointed toward and connected with the steering wheel 2. The first seat 6 is provided with a first saddle 61 and a first handle 62, and a bottom part of the first handle 62 is provided with a first connection part 63, allowing the first handle 62 to be loosely and selectively connected to the first fixed end 13 or the first assembly end 14.

The second seat 7 is located at the second part 12 of the frame 1 (in this embodiment, a pivoting method is used), and is pointed toward and connected with the steering wheel 2. The second seat 7 is provided with a second saddle 71 and a second handle 72, and a bottom part of the second handle 72 is provided with a second connection part 73, allowing the second handle 72 to be loosely and selectively connected to the second fixed end 15 or the second assembly end 16.

The first transmission unit 8 is connected to the first pedaling member 4 and the directional wheel 3, and is provided with a movable first driving gear 81 and a first idler 83 to be selectively gnawed with a first driven gear 82, wherein the first driving gear 81 is connected to the first pedaling member 4, and a first chain 84 is wound on the first driven gear 82 for connecting to the first gear 31 of the directional wheel 3.

The second transmission unit 9 is connected to the second pedaling member 5 and the directional wheel 3, and is provided with a movable second driving gear 91 and a second idler 93 to be selectively gnawed with a second driven gear 92, wherein the second driving gear 91 is connected to the second pedaling member 5, and a second chain 94 is wound on the second driven gear 92 for connecting to the second gear 32 of the directional wheel 3.

Referring FIG. 1, it shows a first riding mode of the present invention. When a first rider and a second rider are to ride on the first seat 6 and the second seat 7 in same direction (forward), which allows the first seat 6 and the second seat 7 to point toward a front side of the frame 1 along a same straight line; the first connection part 63 of the first handle 62, and the second connection part 73 of the second handle 72, will be connected respectively to the first assembly end 14 of the first part 11 and the second assembly end 16 of the second part 12, the connecting rod 17 will be connected to the engaging end 19 (as shown in FIG. 4), the first driving gear 81 of the first transmission unit 8, and the second driving gear 91 of the second transmission unit 9, will be gnawed respectively with the first idler 83 and the second idler 93, and the first idler 83 and the second idler 93 will be gnawed respectively with the first driven gear 82 and the second driven gear 92. Therefore, the first rider and the second rider can step forward on the first pedaling member 4 and the second pedaling member 5 respectively, to drive the first gear 31 and the second gear 32 (as shown in FIG. 6) respectively, through the first driving gear 81, the first idler 83, the first driven gear 82, and the first chain 84 of the first transmission unit 8, as well as the second driving gear 91, the second idler 93, the second driven gear 92, and the second chain 94 of the second transmission unit 9, orderly, thereby linking with the directional wheel 3 to rotate forward. In addition, the first rider will use the first handle 62 to directly control the steering wheel 2 for changing direction.

Figure 2:
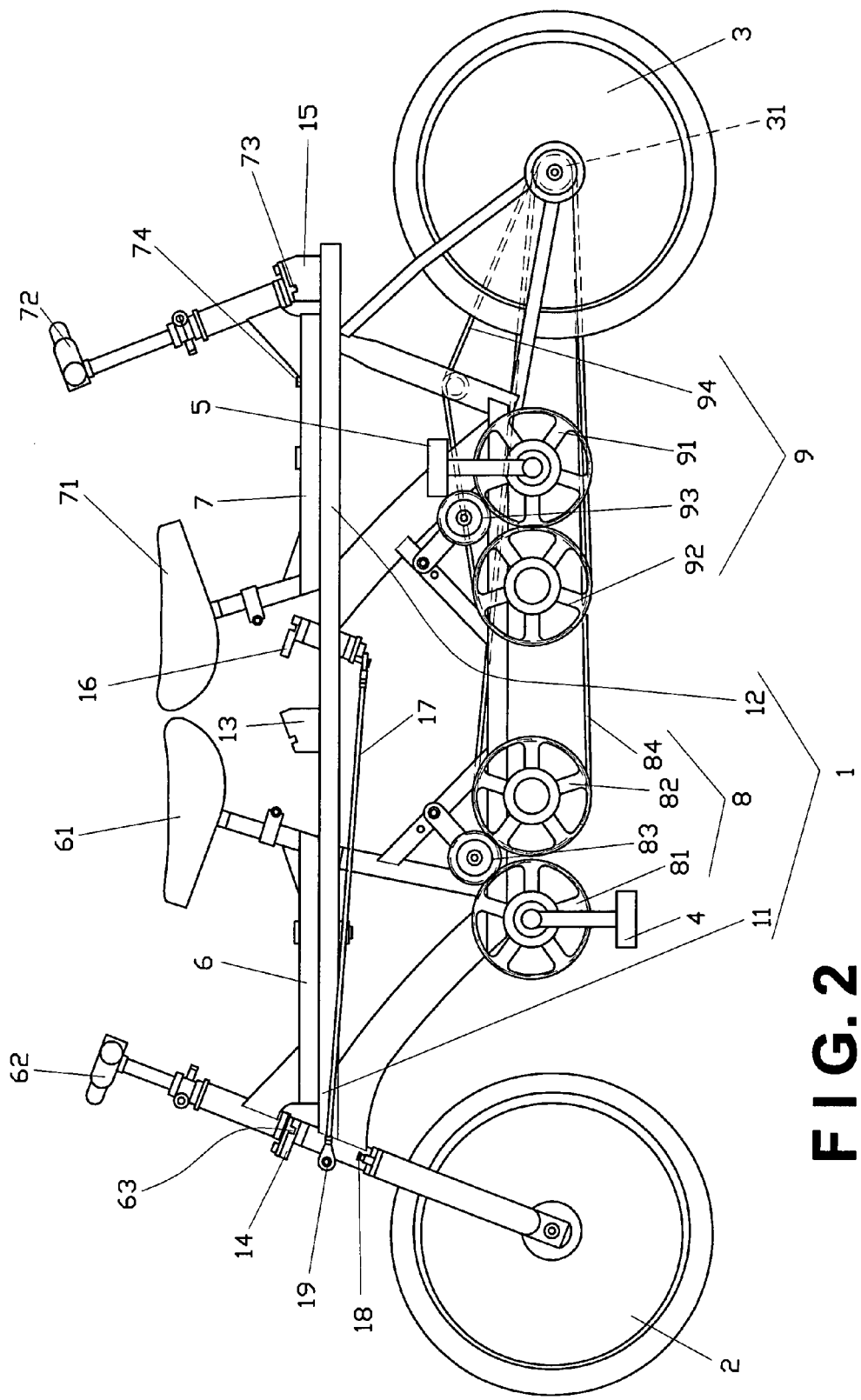
FIG. 2 shows a schematic view of a mode that a first seat and a second seat are facing toward opposite direction, according to the present invention.

Referring to FIG. 2, it shows a second riding mode of the present invention. When the first rider and the second rider are to ride on the first seat 6 and the second seat 7 back to back, the second connection part 73 and the second assembly end 16 are loosened by rotation, and then the second seat 71 is rotated by 180 degrees, enabling the first seat 6 and the second seat 7 to face respectively toward a front and a rear side of the frame 1, along a same straight line. In addition, the second connection part 73 of the second handle 72 is connected on the second fixed end 15 of the second part 12, and the second idler 93 of the second transmission unit 9 is released from the second driven gear 92, enabling the second driving gear 91 to be directly gnawed with the second driven gear 92. Accordingly, the first rider will step on the first pedaling member 4 to drive the first gear 31 for rotating (as shown in FIG. 6), through the first driving gear 81, the first idler 83, the first driven gear 82, and the first chain 84 of the first transmission unit 8, orderly. On the other hand, the second rider will step backward on the second pedaling member 5 to drive the second gear 32 (as shown in FIG. 6) for rotating, through the second driving gear 91, the second driven gear 92, and the second chain 94 of the second transmission unit 9, orderly. In the second transmission unit 9, as the second driving gear 91 directly drives the second driven gear 92, instead of gnawing the second idler 93, the second gear 32 and the first gear 31 can still rotate in the same direction for linking the directional wheel 3 to rotate forward, in spite of that the second pedaling member 5 is stepped on backward. Furthermore, the second rider can still choose to use a method of gnawing the second idler 93 by the second driving gear 91 for driving the second driven gear 92, without releasing the second idler 93 from the second driven gear 92 again. Accordingly, the second rider has to step on along the same direction as the first rider, and the first rider will still use the first handle 62 to directly control the steering wheel 2 for changing direction.

Figure 3:
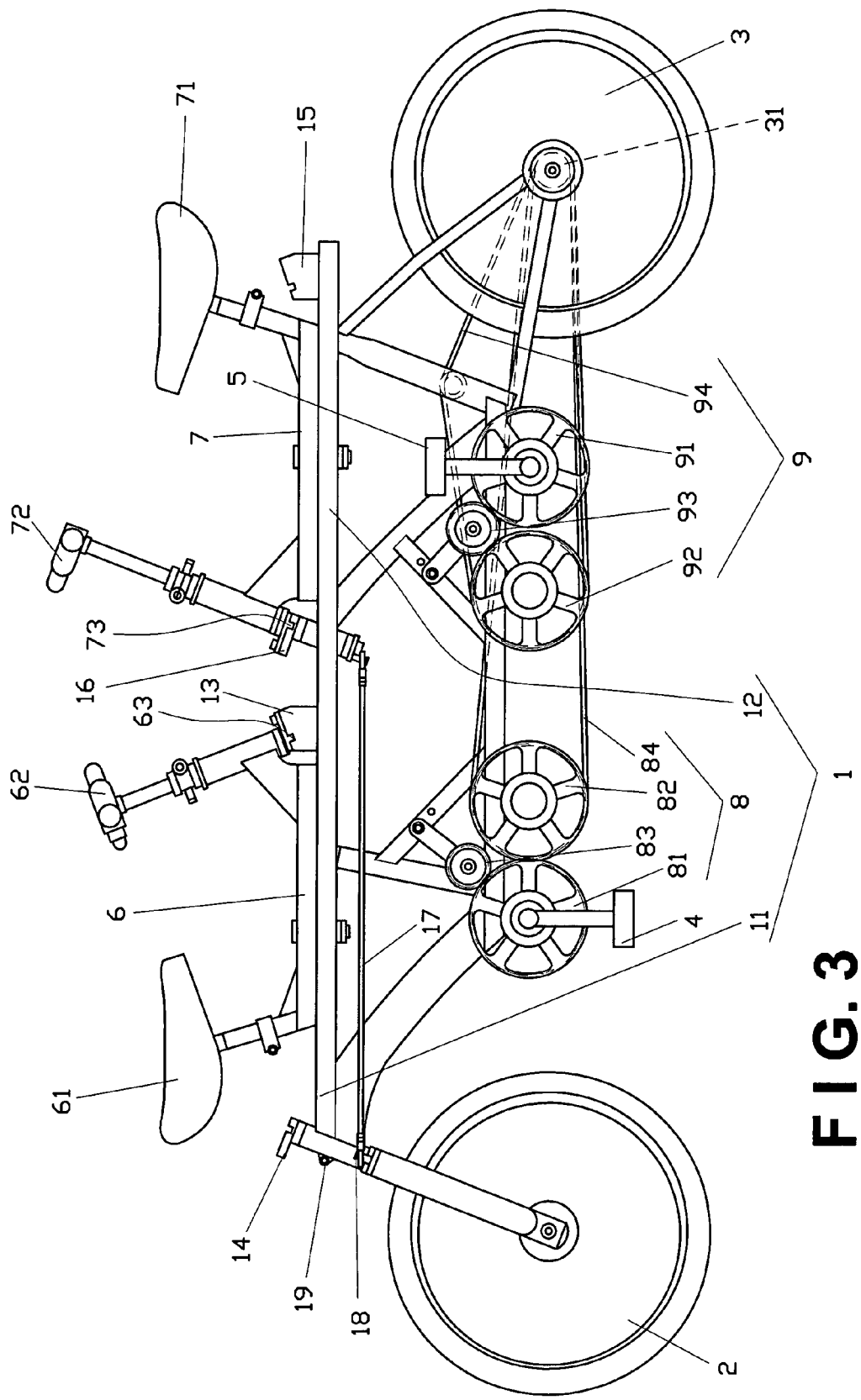
FIG. 3 shows a schematic view of a mode that a first seat and a second seat are facing toward each other, according to the present invention.
Figure 5:
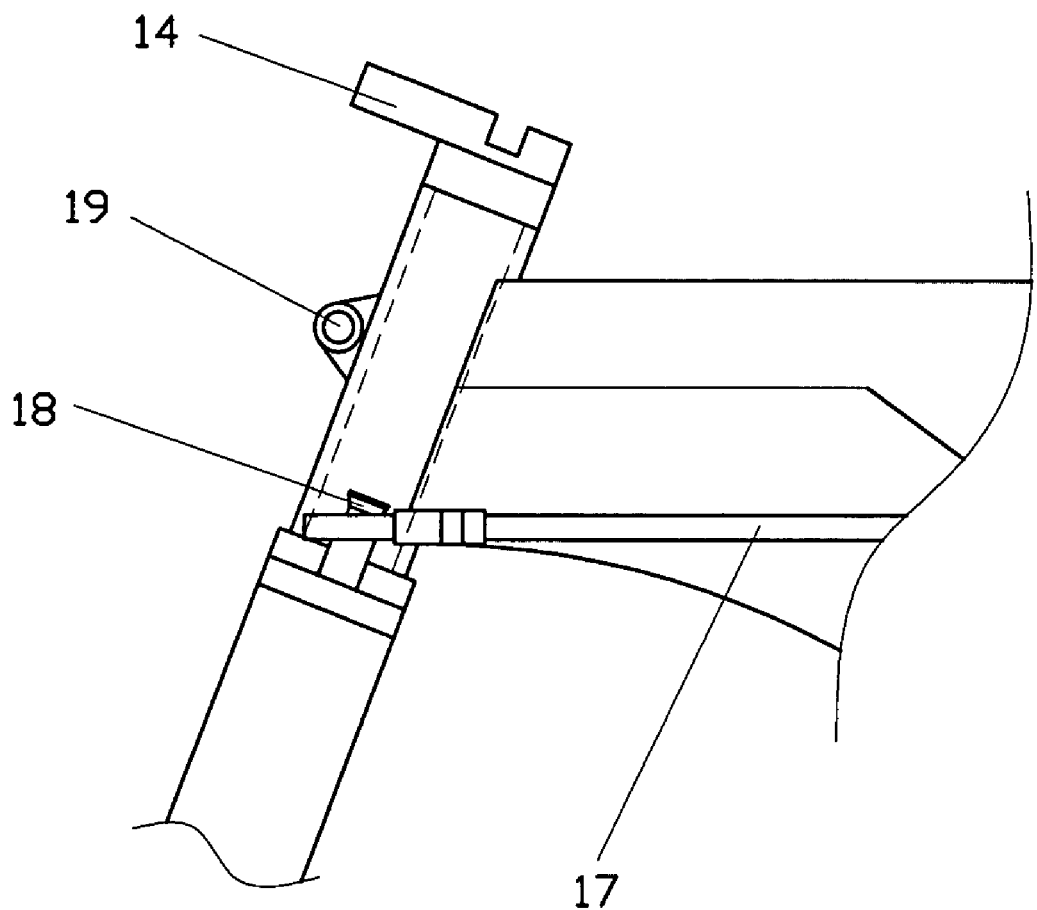
FIG. 5 shows a schematic view of a connecting rod being connected to a control end, according to the present invention.

Referring to FIG. 3, it shows a third riding mode of the present invention. When the first rider and the second rider are to ride on the first seat 6 and the second seat 7 by facing toward each other, the first connection part 63 and the first assembly end 14 are loosened by rotation, and then the first seat 6 is rotated by 180 degrees, enabling the first seat 6 and the second seat 7 to point toward the frame 1 along a same straight line to face toward each other. In addition, the first connection part 63 of the first handle 62 is connected on the first fixed end 13 of the first part 11, and the connecting rod 17 which is linked by the second assembly end 16 of the second handle 72 is removed from the engaging end 19, and is connected to the control end 18 (as shown in FIG. 5). Furthermore, the first idler 83 of the first transmission unit 8 is released from the first driven gear 82, enabling the first driving gear 81 to be directly gnawed with the first driven gear 82. Therefore, the second rider will step on the second pedaling member 5, to drive the second gear 32 (as shown in FIG. 6) for rotating, through the second driving gear 91, the second idler 93, the second driven gear 92, and the second chain 94 of the second transmission unit 9, orderly. On the other hand, the first rider will step on the first pedaling member 4 backward, to drive the first gear 31 for rotating, through the first driving gear 81, the first driven gear 82, and the first chain 84 of the first transmission unit 8, orderly. In the first transmission unit 8, as the first driving gear 81 directly drives the first driven gear 82, instead of gnawing the first idler 83, the first gear 31 and the second gear 32 can still rotate in the same direction for linking the directional wheel 3 to rotate forward, in spite of that the first pedaling member 4 is stepped on backward. In addition, the first rider can still choose to use a method of gnawing the first idler 83 by the first driving gear 81 for driving the first driven gear 82, without releasing the first idler 83 from the first driven gear 82 again. Accordingly, the first rider has to step on along the same direction as the second rider, and as the first rider faces opposite to a front side of the frame 1, the second rider will use the second handle 72 to control the steering wheel 2 for changing direction, through the connecting rod 17 to link the control end 18.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multi-mode tandem bicycle comprising:
   a frame which includes a first part and a second part that are connected with each other;
   a steering wheel which is located at the first part of the frame;
   a directional wheel which is located at the second part of the frame;
   a first pedaling member which is pivotally located at the first part of the frame;
   a second pedaling member which is pivotally located at the second part of the frame;
   a first seat, which is located at the first part of the frame, and includes a first saddle and a first handle;
   a second seat, which is located at the second part of the frame, and includes a second saddle and a second handle;
   a first transmission unit which connects the first pedaling member and the directional wheel; and
   a second transmission unit which connects the second pedaling member and the directional wheel;
   at least one of said first seat and the second seat being changeable to a different direction and being fixed in that direction on said frame, and at least one of the first seat and the second seat being pointed toward and connected with the steering wheel;
   wherein the directional wheel is provided with a first gear, and the first transmission unit is provided with a movable first driving gear and a first idler to be selectively gnawed with a first driven gear; the first transmission unit being provided with the first driving gear for connecting to the first pedaling member, and a first chain being wound on the first driven gear for connecting to the first gear of the directional wheel.

2. A multi-mode tandem bicycle comprising:
   a frame which includes a first part and a second part that are connected with each other;
   a steering wheel which is located at the first part of the frame;
   a directional wheel which is located at the second part of the frame;
   a first pedaling member which is pivotally located at the first part of the frame;
   a second pedaling member which is pivotally located at the second part of the frame;
   a first seat, which is located at the first part of the frame, and includes a first saddle and a first handle;
   a second seat, which is located at the second part of the frame, and includes a second saddle and a second handle;
   a first transmission unit which connects the first pedaling member and the directional wheel; and
   a second transmission unit which connects the second pedaling member and the directional wheel;
   at least one of said first seat and the second seat being changeable to a different direction and being fixed on said frame, and at least one of the first seat and the second seat being pointed toward and connected with the steering wheel;
   wherein the directional wheel is provided with a second gear, and the second transmission unit is provided with a movable second driving gear and a second idler to be selectively gnawed with a second driven gear; the second transmission unit being provided with the second driving gear for connecting to the second pedaling member, and a second chain being wound on the second driven gear for connecting to the second gear of the directional wheel.

\* \* \* \* \*